United States Patent
Gierszewski

(10) Patent No.: US 8,342,206 B2
(45) Date of Patent: Jan. 1, 2013

(54) DUAL BUTTERFLY CONTROL VALVE AND METHOD OF USE

(75) Inventor: John D. Gierszewski, Creve Coeur, IL (US)

(73) Assignee: Caterpillar Inc., Peoria, IL (US)

(*) Notice: Subject to any disclaimer, the term of this patent is extended or adjusted under 35 U.S.C. 154(b) by 248 days.

(21) Appl. No.: 12/857,696

(22) Filed: Aug. 17, 2010

(65) Prior Publication Data
US 2012/0042955 A1  Feb. 23, 2012

(51) Int. Cl.
*F16K 39/02* (2006.01)

(52) U.S. Cl. .............. 137/630.15; 137/630; 137/601.17; 137/601.16; 137/630.22

(58) Field of Classification Search ......... 123/336, 123/337, 403, 442; 137/15.25, 315.22, 315.24, 137/599.16, 630, 630.11, 630.14, 630.15, 137/630.19, 630.21, 630.22, 601.16, 601.17; 251/77, 308
See application file for complete search history.

(56) References Cited

U.S. PATENT DOCUMENTS

| | | | | |
|---|---|---|---|---|
| 2,105,343 | A * | 1/1938 | Briggs | 251/308 |
| 2,412,918 | A * | 12/1946 | Sladky | 251/305 |
| 3,633,626 | A * | 1/1972 | Zirps et al. | 137/637.3 |
| 3,934,851 | A * | 1/1976 | Illing | 251/305 |
| 3,957,590 | A * | 5/1976 | Rohde | 137/630.15 |
| 4,759,326 | A * | 7/1988 | Uthoff et al. | 123/337 |
| 4,779,590 | A * | 10/1988 | Uthoff, Jr. | 123/337 |
| 4,840,146 | A * | 6/1989 | Yanagisawa et al. | 123/336 |
| 4,962,783 | A | 10/1990 | Ball et al. | |
| 4,969,485 | A | 11/1990 | Ball et al. | |
| 5,102,097 | A | 4/1992 | Davis et al. | |
| 5,374,031 | A | 12/1994 | Semence et al. | |
| 5,657,731 | A | 8/1997 | Kim | |
| 5,749,336 | A * | 5/1998 | Tamaki et al. | 123/337 |
| 6,273,136 | B1 * | 8/2001 | Steinert et al. | 137/630 |
| 7,219,651 | B2 | 5/2007 | Yamamoto et al. | |
| 7,234,444 | B2 | 6/2007 | Nanba et al. | |
| 7,264,221 | B2 | 9/2007 | Yeary et al. | |
| 2008/0168965 | A1 | 7/2008 | Shimura et al. | |
| 2009/0114868 | A1 | 5/2009 | Lee | |

FOREIGN PATENT DOCUMENTS

| | | |
|---|---|---|
| JP | 59086328 | 6/1984 |
| JP | 01073159 | 3/1989 |
| JP | 2005105820 | 4/2005 |
| JP | 2010084749 | 4/2010 |
| SU | 475483 | 9/1975 |

* cited by examiner

*Primary Examiner* — Eric Keasel
*Assistant Examiner* — Craig J Price
(74) *Attorney, Agent, or Firm* — Miller, Matthias & Hull

(57) ABSTRACT

A valve for a plenum or pipe is disclosed. The valve includes a large butterfly valve element pivotally supported in the plenum by at least one rod. The large butterfly valve element includes an opening for accommodating a small butterfly valve element. The small butterfly valve element is coupled to the rod by a shaft. The shaft includes a recess that accommodates the small butterfly valve element but which includes a clearance between the small butterfly valve element and the shaft to permit limited rotation of the shaft before the small butterfly valve element engages at least one wall of the recess of the shaft. Thus, the combination of the shaft and the small butterfly valve element provide limited flow through the plenum. Further rotation of the shaft, however, results in rotation of the large butterfly valve element to provide greater flow through the plenum.

20 Claims, 3 Drawing Sheets

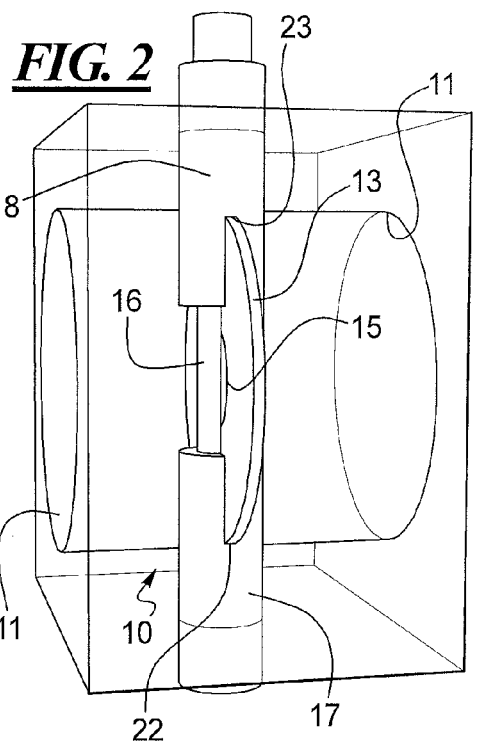
FIG. 2
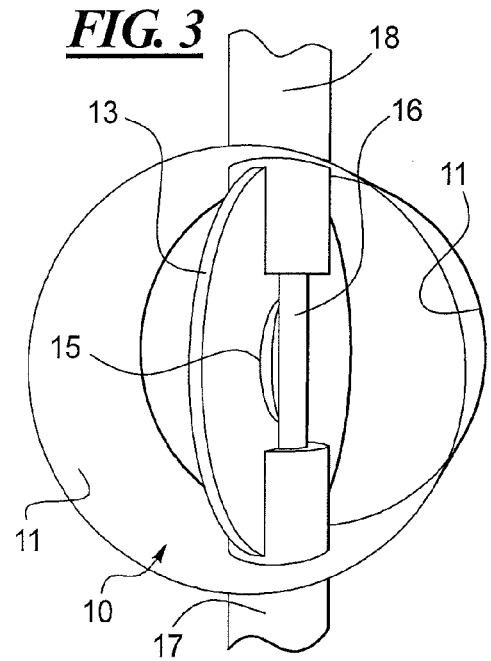
FIG. 3
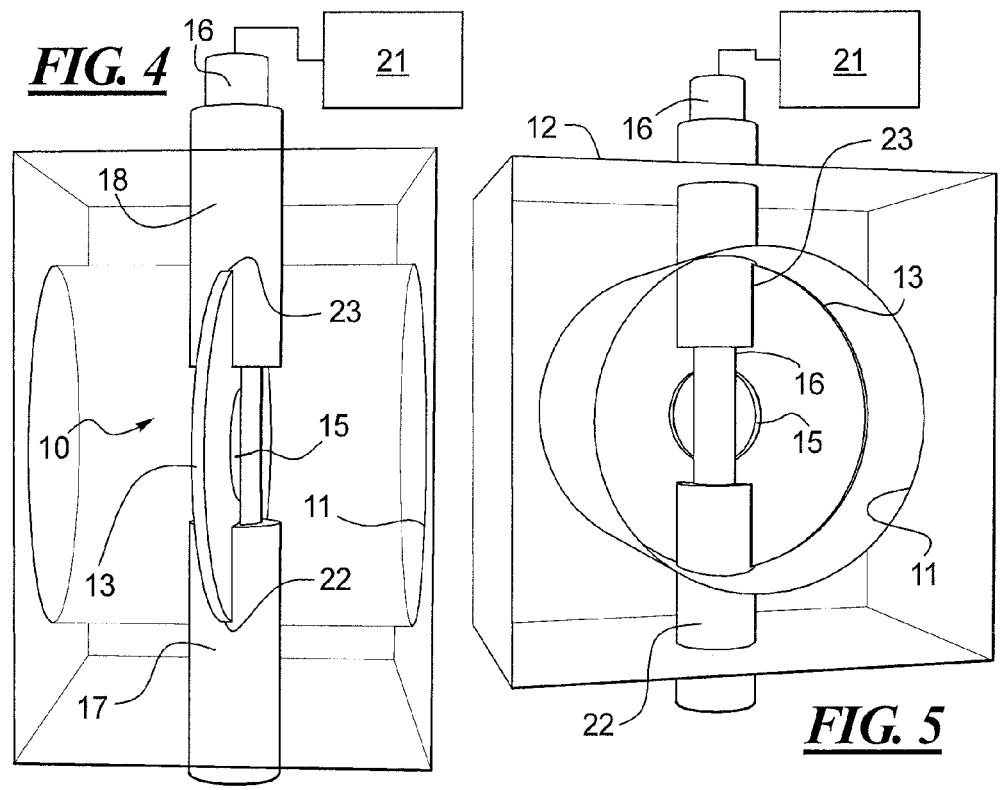
FIG. 4
FIG. 5

DUAL BUTTERFLY CONTROL VALVE AND METHOD OF USE

TECHNICAL FIELD

This disclosure relates generally to butterfly valves and method for controlling a fluid flow through a plenum using a dual butterfly valve.

BACKGROUND

Butterfly valves are valves which can be used for isolating or regulating fluid flow through a pipe, passageway or plenum. The closing mechanism is in the form of a disk. Operation is similar to that of a ball valve, which allows for quick shut off. Butterfly valves are generally favored because they are lower in cost to other valve designs. The disc is positioned in the center of the pipe or plenum. A rod passes through the disc and is connected to an actuator. The actuator turns the disc either parallel (open) or perpendicular (closed) to the flow. Unlike a ball valve, the disc is always present within the flow, therefore a pressure drop is always induced in the flow, regardless of valve position. A butterfly valve may also be opened incrementally to throttle flow.

Exhaust gas recycling ("EGR") equipment directs exhaust gas flowing through an exhaust pipe of an engine for mixing with intake air flowing through an intake pipe to burn particulates trapped in a diesel filter. Other toxic substance in the exhaust gas may be combusted as well. EGR is used to reduce NOX emission produced in the combustion process. However too much EGR will cause the engine performance to suffer. Therefore the EGR must be precisely regulated.

Butterfly-type exhaust gas control valves for adjusting the EGR are known. Typically, the butterfly valve operates by a torque motor or actuator through a valve shaft. However, precise control of the exhaust gas flow is limited, especially when a low flow rate is desired. Currently available butterfly valves normally operate best in fully open or fully closed positions. Thus, a need exists for an improved butterfly-type valve or improved alternatives that provide improved flow control.

SUMMARY OF THE DISCLOSURE

In one aspect, a valve for a plenum or pipe is disclosed. The valve may include a large butterfly valve element pivotally supported in the plenum by at least one rod. The large butterfly valve element may include be coupled to a small butterfly valve element. The small butterfly valve element may be coupled to the rod by a shaft. The shaft may include a recess that accommodates the small butterfly valve element. The recess of the shaft may be disposed between two opposing walls. Each wall may provide a clearance between the small butterfly valve element and the shaft to permit limited rotation of the small butterfly valve element before the small butterfly valve element engages a wall of the shaft. As a result, after the small butterfly valve element engages one wall of the recess of the shaft, further rotation of the small butterfly valve element results in rotation of the large butterfly valve element as the valve moves from a lower flow rate position to a higher flow rate.

In another aspect, a valve is disclosed for controlling the fluid flow. The valve may include a large butterfly valve element pivotally supported in a plenum by at least one rod. The large butterfly valve element may be coupled to a small butterfly valve element. The small butterfly valve element may be coupled to the rod by a shaft. The shaft includes a recess that accommodates the small butterfly valve element. The recess of the shaft may be disposed between two opposing walls. Each wall may provide a clearance between the small butterfly valve element and a shaft to permit limited rotation of the small butterfly valve element before the small butterfly valve element engages the walls of the recess of the shaft to thereby move the small butterfly valve element towards an open or partially open position. The large butterfly valve element may be coupled to a spring for biasing the large butterfly valve element towards a closed position. The small butterfly valve element may be coupled to an actuator for moving the small butterfly valve element between open and closed positions.

After the small butterfly valve element engages one wall of the recess of the shaft, and further rotation of the small butterfly valve element results in rotation of the large butterfly valve element towards an open position as the bias of the spring is overcome. Thus, a range of flow rates are available. Low flow rates may be provided by moving the small butterfly valve element to a partially open or fully open position and higher flow rates may be provided by using the small butterfly valve element to move the large butterfly valve element from a closed position towards a fully open position or a position between the two extremes.

In another aspect, a method for controlling fluid flow through a plenum is also disclosed. The method includes installing a valve in the plenum. The valve includes a large butterfly valve element pivotally supported in the plenum by at least one rod. The large butterfly valve element may be coupled to a small butterfly valve element. The small butterfly valve element may be coupled to the rod by a shaft. The shaft may include a recess that accommodates the small butterfly valve element. The recess of the shaft may be disposed between two opposing walls with each wall providing a clearance between the small butterfly valve element and the shaft to permit limited rotation of the small butterfly valve element before the small butterfly valve element engages the walls of the recess of the shaft to thereby move the small butterfly valve element towards an open position. The small butterfly valve element may be coupled to an actuator for moving the small butterfly valve element between closed and open positions. The large butterfly valve element may be coupled to a spring for biasing the large butterfly valve element towards a closed position. The method includes moving the small butterfly valve element to engage at least one wall of the recess of the shaft to provide limited flow through the plenum. The method may further include continuing to rotate the small butterfly valve element resulting in rotation of the large butterfly valve element towards an open position to provide greater flow through the plenum as the bias of the spring is overcome.

In another aspect, the large butterfly valve element may include an opening, a recess or a cut-out in which the small butterfly valve element is disposed. The large butterfly valve element may be coupled to a spring for biasing the large butterfly valve element towards a closed position. In another aspect, in combination with any of the embodiments described above, after the small butterfly valve element engages one wall of the recess of the shaft, additional rotational movement of the small butterfly valve element overcomes the bias of the spring to move the larger butterfly valve element towards an open position. In combination with any one or more of the aspects described above, the spring may be coupled to the rod and the plenum. In combination with any one or more of the aspects described above, the large butterfly valve element may be supported in the plenum by a pair of rods. In combination with any one or more of the aspects described above, the rods may be disposed diametrically opposite the large butterfly valve element from one another. In combination with any one or more of the aspects described above, the shaft may extend axially into the rod. In combination with any one or more of the aspects described above, the shaft may extend axially into or through both rods. In combination with any one or more of the aspects described above, the small butterfly valve element may be in communication with an actuator for moving the small butterfly valve element between open and closed positions. In combination with any one or more of the aspects described above, the spring may couple the rod to the plenum. In combination with any one or more of the aspects described above, the clearance between the small butterfly valve element and the walls of the recess of the shaft may range from about 5° to about 30°. In combination with any one or more of the aspects described above, the clearance between the small butterfly valve element and the walls of the recess of the shaft may be about 20°.

BRIEF DESCRIPTION OF THE DRAWINGS

FIG. 2. is a side perspective view of the valve and plenum shown in FIG. 1 with the valve in a fully closed position;

FIG. 3 is a perspective view of the valve and plenum shown in FIGS. 1 and 2 with the valve in a fully open position;

FIG. 4 is a side perspective view of the valve and plenum shown in FIGS. 1-3 with the small butterfly valve element opened about 20°;

FIG. 5 is a front perspective view of the valve and plenum illustrated in FIGS. 1-4 with the small butterfly valve element opened about 20°;

DETAILED DESCRIPTION

Figure 1:
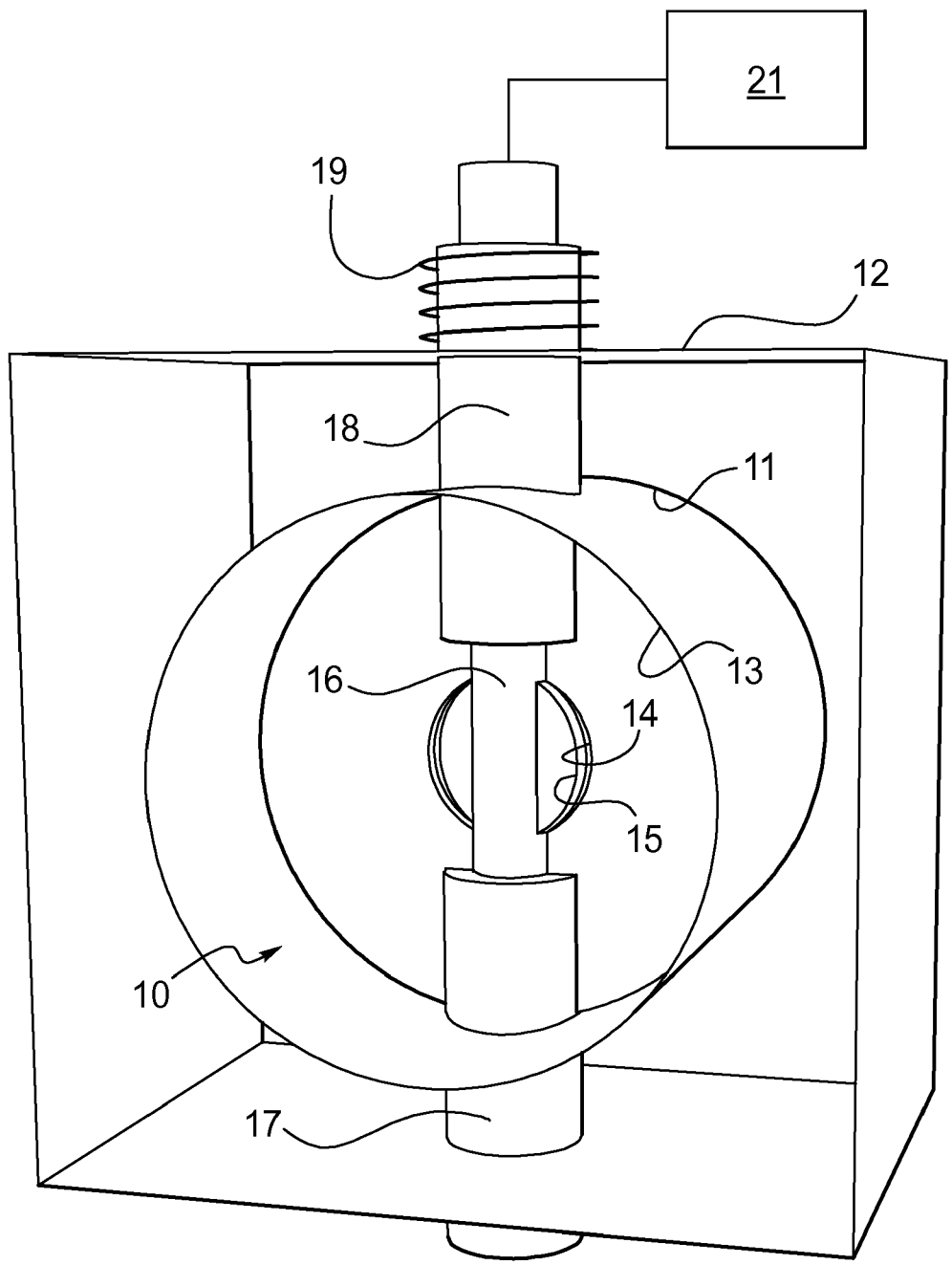
FIG. 1. is a perspective view of a disclosed dual butterfly valve installed in a plenum.

Referring to FIG. 1, a valve 10 is disclosed which is disposed within a plenum 11 that passes through a base structure 12. The valve 10 includes a large butterfly valve element 13. The large butterfly valve element 13 includes an opening 14, in which a small butterfly valve element 15 is disposed. The small butterfly valve element 15 does not need to be centrally located within the large butterfly valve element 13. Instead, the small butterfly valve element 15 may be a lower or upper section of the large butterfly valve element 13 as will be apparent to those skilled in the art.

As discussed in greater detail below, the small butterfly valve element 15 is supported by the shaft 16 and the large butterfly valve element 13 is supported by a pair of rods 17, 18. One of the rods 17, 18 is coupled to a spring 19 which biases the large and small butterfly valve elements 13, 15 towards a closed position as shown in FIG. 1. The shaft 16 is coupled to an actuator 21 which provides the initial rotation of the shaft 16 and small butterfly valve element 15 as well as the further rotation of the large butterfly valve element 13 as discussed below.

Turning to FIG. 2, the valve 10 is disposed in the plenum 11 in a fully closed position. The large butterfly valve element 13 shown is supported in slots 22, 23 in the rods 17, 18. The shaft 16 is also slotted for accommodating the small butterfly valve element 15.

In FIG. 3, the valve 10 has been moved to a fully open position with the large butterfly valve element 13 being rotated about 90° from the position shown in FIG. 2. In FIG. 4, the actuator 21 has rotated the shaft 16 about 20° so the small butterfly valve element 15 is just beginning to turn within the large butterfly valve element 13, which has yet to move from the closed position. FIG. 5 is a front or end view of the position shown in FIG. 4, which is a side view.

Figure 6:
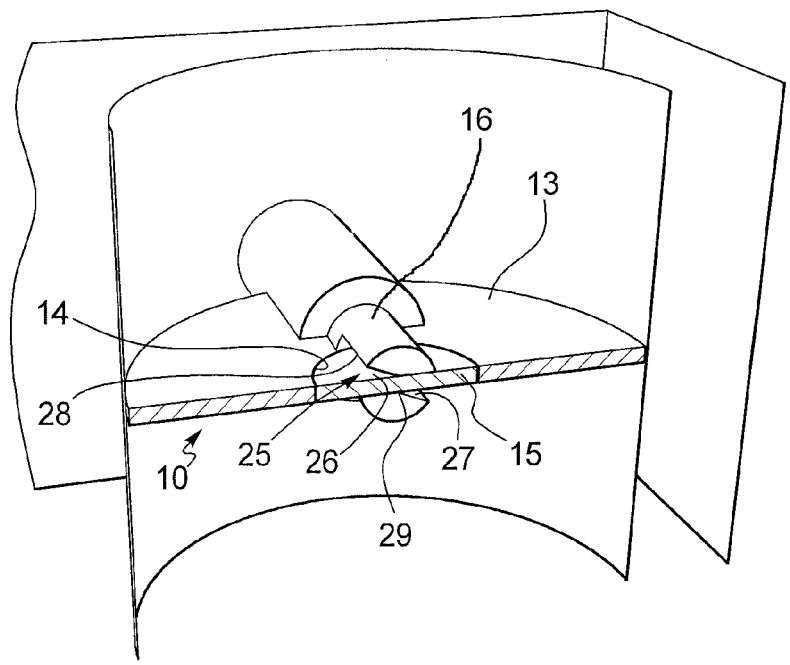
FIG. 6 is a partial view of the valve illustrated in FIGS. 1-5 particularly illustrating the relationship between the small butterfly valve element and the recess of the shaft in which it is disposed and the clearance provided by the recess of the shaft that permits the small butterfly valve element to rotate a limited amount before causing the large butterfly valve element to rotate and overcome the bias of the spring.
Figure 7:
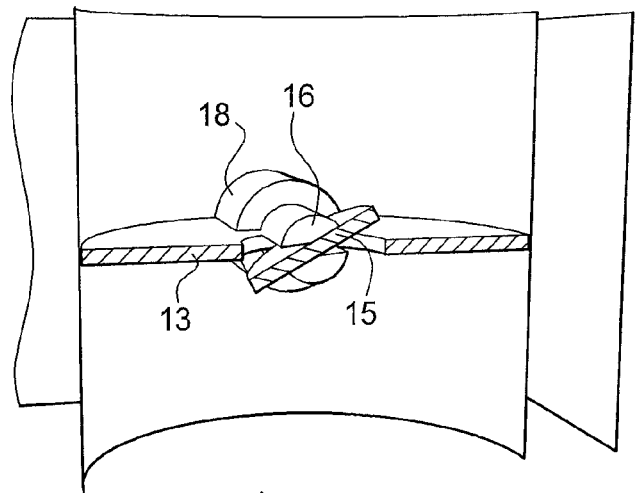
FIG. 7 is another partial view of the valve disclosed in FIGS. 1-6 particularly illustrating the rotation of the small butterfly valve element until it engages the recess of the shaft in which it is disposed just prior to imparting rotation to the large butterfly valve element.
Figure 8:
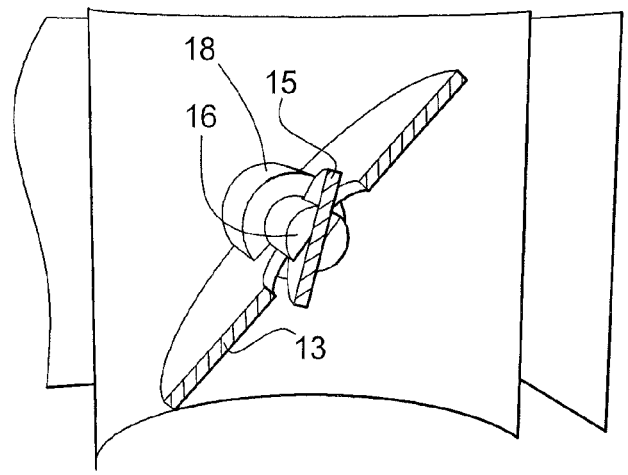
FIG. 8 is another partial view illustrating about a 70° rotation of the small butterfly valve element which has caused substantial rotation of the large butterfly valve element.

Turning to FIG. 6, a partial view of the valve 10 is shown. The shaft 16 includes a recess 25 in which the small butterfly valve element 15 is disposed. The recess 25 includes two clearances 26, 27 that permits limited rotation of the shaft 16 prior to the shaft 16 engaging the small butterfly valve element 15. That is, in the example shown in FIG. 6, the shaft 16 will rotate about 20° before the surfaces 28, 29 of the shaft 16 will engage the small butterfly valve element 15 and cause rotation of the small butterfly valve element 15 out of the opening 14 in the large butterfly valve element 13. In this manner, rotation of the shaft 16 can open the small butterfly valve element 15 slightly, or a small amount as shown in FIG. 7 prior to the opening of the large butterfly valve element 13. In FIG. 7, the small butterfly valve element 15 has been rotated about 20°. In FIG. 8, in contrast, the small butterfly valve element 15 has been rotated about 70° thereby causing the large butterfly valve element 13 to have rotated about 50°.

Thus, the dual butterfly valve 13, 15 design of the valve 10 enables small or incremental flow through the small butterfly valve element 15 and larger flow once the large butterfly valve element 13 is opened or in the fully open position as shown in FIG. 3. The actuator 21 may be a typical electronic actuator or may form part of an engine control module (ECM). The rods 17, 18, shaft 16 and butterfly valve elements 13, 15 should be fabricated from materials robust enough to withstand exhaust temperatures of typical gasoline or diesel engines. Of course, the disclosed valve is not limited to use in exhaust gas recycling equipment, but may be used for controlling flow through any pipe or plenum and therefore the materials of construction can vary greatly. The rotary spring 19 could be disposed on either rod 18 or 17 and springs other than rotary springs may be utilized as will be apparent to those skilled in the art.

Another variation would be to have the small butterfly valve element 15 coupled to the large butterfly valve element 13, but not disposed in a central opening in the large butterfly valve element. Such an embodiment would involve the small butterfly valve element 15 being and upper, lower or side section of the large butterfly valve element 13. The coupling between the small and large butterfly valve elements 15, 13 could be the same or similar.

INDUSTRIAL APPLICABILITY

In general, this disclosure provides a valve for a plenum or a pipe to control the flow of fluid through the plenum or pipe. The disclosed valve a dual butterfly valve with a large butterfly valve element pivotally supported in the plenum by at least one rod and typically two rods disposed diametrically opposite the large butterfly valve element from one another. The large butterfly valve element includes an opening for accommodating a small butterfly valve element. The small butterfly valve element is coupled to a shaft that, in turn, is coupled to a rod that supports the large butterfly valve element. The shaft includes a recess in which the small butterfly valve element is accommodated. The recess of the shaft includes two opposing walls, which may be non-planar, but each wall provides a clearance between the small butterfly valve element and the shaft or walls of the recess of the shaft to permit limited rotation of the shaft before the small butterfly valve element is engaged and rotates. After the small butterfly valve element engages a wall of the recess of the shaft, further rotation of the shaft results in rotation of the large butterfly valve element against the bias of the spring or biasing element.

A method for controlling fluid flow through a plenum is also disclosed. The disclosed method includes installing a valve in the plenum. The valve includes a large butterfly valve element pivotally supported in the plenum by at least one rod. The large butterfly valve element includes an opening for accommodating a small butterfly valve element. The small butterfly valve element may be coupled to the rod by a shaft. The shaft includes a recess that accommodates the small butterfly valve element. The recess of the shaft may be disposed between two opposing walls, neither of which are planar but both of which provide a clearance between the small butterfly valve element and the shaft to permit limited rotation of the shaft before the small butterfly valve element engages the walls of the recess of the shaft to thereby move the small butterfly valve element towards an open position. The small butterfly valve element is coupled to an actuator for moving the small butterfly valve element between closed and open positions. The large butterfly valve element is coupled to a spring or other biasing element for biasing the larger butterfly valve element towards a closed position. The method includes moving the shaft to engage at least one wall of the recess of the shaft with the small butterfly valve element to provide a limited flow through the plenum. The method also includes continuing to rotate the small butterfly valve element with the shaft resulting in rotation of the large butterfly valve element towards an open position to provide greater flow through the plenum.

The disclosed designs and method are applicable to a wide variety of applications that involve a fluid flowing through a pipe or plenum where control of the flow is desirable.

What is claimed is:

1. A valve for a plenum, the valve comprising:
   a large butterfly valve element pivotally supported in the plenum by at least one rod, the large butterfly valve element includes an opening for accommodating a small butterfly valve element;
   the small butterfly valve element coupled to the rod by a shaft, the shaft includes a recess that accommodates the small butterfly valve element, the recess of the shaft disposed between two opposing walls, each wall providing a clearance between the small butterfly valve element and the shaft to permit limited rotation of the shaft before the small butterfly valve element engages at least one wall of the recess of the shaft;
   wherein, after the small butterfly valve element engages a wall of the recess of the shaft, further rotation of the shaft results in rotation of the large butterfly valve element.

2. The valve of claim 1 wherein the large butterfly valve element is coupled to a spring for biasing the biasing the large butterfly valve element towards a closed position.

3. The valve of claim 2 wherein, after the small butterfly valve element engages one of the wall of the recess of the shaft, additional rotational movement of the small butterfly valve element overcomes the bias of the spring to move the large butterfly valve element towards an open position.

4. The valve of claim 2 wherein the spring is coupled to the rod and the plenum.

5. The valve of claim 1 wherein the large butterfly valve element is supported in the plenum by a pair of rods.

6. The valve of claim 5 wherein the rods are disposed diametrically opposite the large butterfly valve element from one another.

7. The valve of claim 1 wherein the shaft extends axially into the rod.

8. The valve of claim 5 wherein the shaft extends axially into both rods.

9. The valve of claim 1 wherein the wherein the small butterfly valve element is in communication with an actuator for moving the small butterfly valve element between open and closed positions.

10. The valve of claim 2 wherein the wherein the spring couples the rod to the plenum.

11. The valve of claim 1 wherein the clearance between the small butterfly valve element and the walls of the recess of the shaft ranges from about 5 to about 30°.

12. The valve of claim 1 wherein the clearance between the small butterfly valve element and the walls of the recess of the shaft is about 20°.

13. A valve for controlling flow to a exhaust gas recycling system of an engine, the valve comprising:
   a large butterfly valve element pivotally supported in plenum by at least one rod, the large butterfly valve element includes an opening for accommodating a small butterfly valve element;
   the small butterfly valve element being coupled to the rod by a shaft, the shaft includes a recess that accommodates the small butterfly valve element, the recess of the shaft being disposed between two opposing walls, each wall providing a clearance between the small butterfly valve element and the shaft to permit limited rotation of the shaft before the small butterfly valve element engages the walls of the recess of the shaft to thereby move the small butterfly valve element towards an open position;
   the large butterfly valve element being coupled to a spring for biasing the large butterfly valve element towards a closed position;
   the shaft element being coupled to an actuator for moving the small butterfly valve element between open and closed positions;
   wherein, after the small butterfly valve element engages one wall of the recess of the shaft, further rotation of the small butterfly valve element results in rotation of the large butterfly valve element towards an open position.

14. The valve of claim 13 wherein, after the small butterfly valve element engages one of the wall of the recess, additional rotational movement of the small butterfly valve element causes the large butterfly valve element to overcome the bias of the spring to move the large butterfly valve element towards an open position.

15. The valve of claim 13 wherein the spring couples the rod to the plenum.

16. The valve of claim 13 wherein the large butterfly valve element is supported in the plenum by a pair of rods diametrically opposite the large butterfly valve element from one another.

17. The valve of claim 16 wherein the shaft extends axially into both rods.

18. The valve of claim 13 wherein the clearance between the small butterfly valve element and the walls of the recess of the shaft ranges from about 5 to about 30°.

19. The valve of claim 1 wherein the clearance between the small butterfly valve element and the walls of the recess of the shaft is about 20°.

20. A method for controlling fluid flow through a plenum, the method comprising:

installing a valve in the plenum, the valve including a large butterfly valve element pivotally supported in the plenum by at least one rod, the large butterfly valve element including an opening for accommodating a small butterfly valve element, the small butterfly valve element coupled to the rod by a shaft, the shaft includes a recess that accommodates the small butterfly valve element, the recess of the shaft being disposed between two opposing walls, each wall providing a clearance between the small butterfly valve element and the shaft to permit limited rotation of the shaft before the small butterfly valve element engages the walls of the recess of the shaft to thereby move the small butterfly valve element towards an open position, the small butterfly valve element coupled to an actuator for moving the small butterfly valve element between closed and open positions, the large butterfly valve element being coupled to a spring for biasing the large butterfly valve element towards a closed position;

moving the shaft to engage at least one wall of the recess of the shaft with the small butterfly valve to provide limited flow through the plenum;

continuing to rotate the small butterfly valve element resulting in rotation of the large butterfly valve element towards an open position to provide greater flow through the plenum.

* * * * *